Oct. 3, 1950    V. S. RUTHERFORD ET AL    2,524,478
BOLOMETER

Filed April 2, 1949    3 Sheets-Sheet 1

INVENTORS
VICTOR S. RUTHERFORD
AND JAMES F. ENGLISH JR.
BY
Raymond D. Jenkins
ATTORNEY Oct. 3, 1950 V. S. RUTHERFORD ET AL 2,524,478
BOLOMETER
Filed April 2, 1949 3 Sheets-Sheet 3
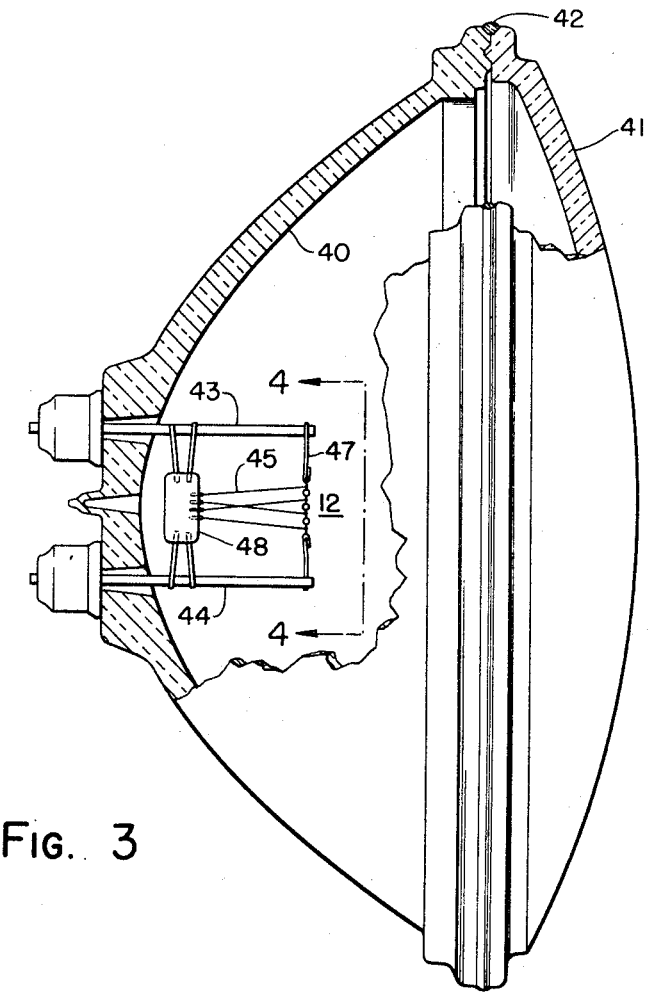
Fig. 3
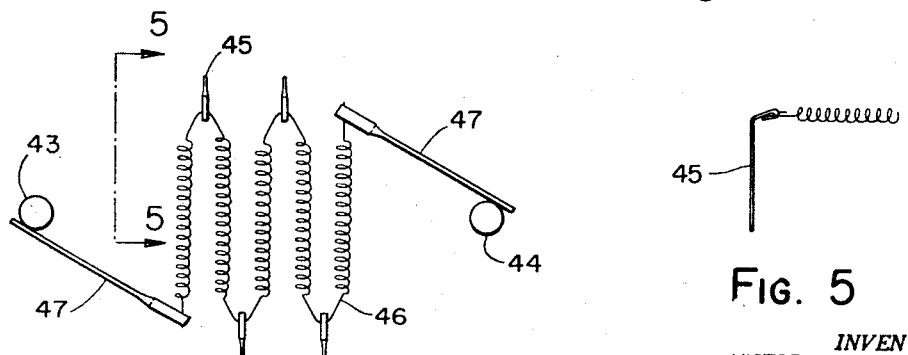
Fig. 4
Fig. 5
INVENTORS
VICTOR S. RUTHERFORD
AND JAMES F. ENGLISH JR.
BY
Raymond D. Junkin
ATTORNEY Patented Oct. 3, 1950

2,524,478

UNITED STATES PATENT OFFICE 2,524,478

BOLOMETER

Victor S. Rutherford, East Cleveland, and James F. English, Jr., Lakewood, Ohio, assignors to Bailey Meter Company, a corporation of Delaware Application April 2, 1949, Serial No. 85,083

3 Claims. (Cl. 201—63)

Our invention relates to a device which is sensitive to total thermal radiant energy emitted by a source, regardless of wave length. While it may be included in a measuring system to perform some particular function or operation responsive to a selected band of wave lengths it, nevertheless, is not limited to any particular band of thermal radiation.

Thermal radiation or thermal radiant energy may be defined as that radiation, emitted by a body or substance, usually only by solids or liquids, whose quantity or quality depends mainly on the temperature and emissivity of the body or substance. The spectral distribution of emissive radiation is continuous and changes smoothly with temperature through infra-red, the visible band and into ultra-violet.

Such a device as we have invented is commonly termed a "bolometer" and is usually defined as a device sensitive to total thermal radiation for producing an effect representative of the energy level of radiation received. In our usage herein, we limit the bolometer to the electric resistance type wherein the change in temperature of the target of the bolometer due to receipt of radiant energy varies the electrical resistance of the target. It is in effect an electrical resistance thermometer of the A.-C. type.

One particular object of our invention is to provide an improved bolometer sensitive to all wave lengths of thermal radiant energy.

A further object is to provide such a device producing an electrical effect representative of the energy level of received radiation with greater efficiency than known devices.

A still further object is to provide such a device, useful in measuring and control systems, which is not limited to certain wave lengths but is universally receptive to all wave lengths of what is now recognized as thermal radiant energy.

With these and further objects in mind we will describe certain preferred embodiments of our invention.

In the drawings:

Fig. 1 diagrammatically shows a measuring circuit in which the device of our invention may be included.

Fig. 3 is a partially sectioned side view of a preferred form of our device.

Fig. 4 is a view of a portion of our device in the direction of the arrows 4—4 of Fig. 3.

Fig. 5 is a view of a target support in the direction of the arrows 5—5 of Fig. 4.

Figure 1:
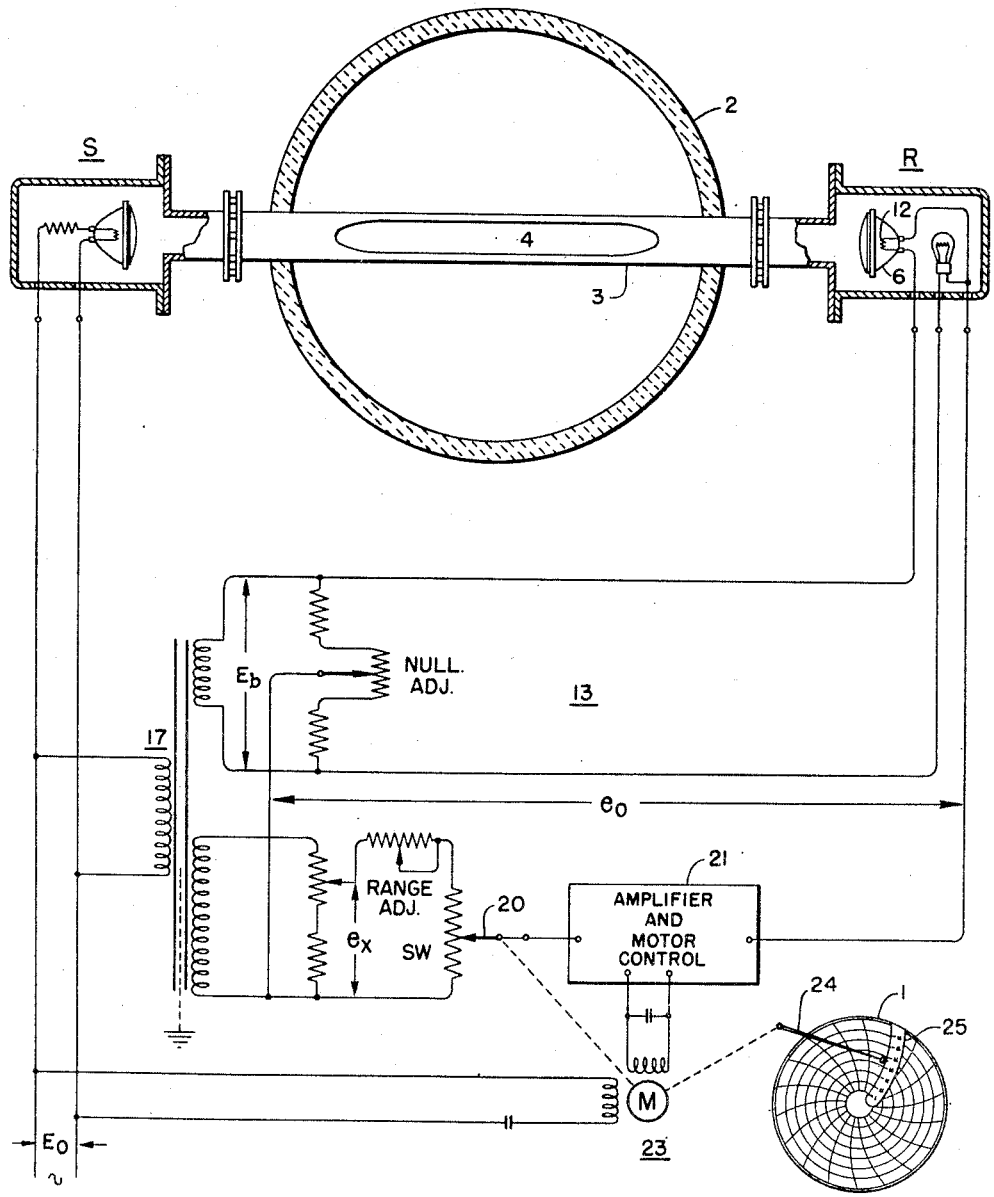

Referring now in particular to Fig. 1, we show therein, in quite diagrammatic form, a smoke-density measuring system in which our improved bolometer is included. The arrangement is adapted to continuously record upon a chart 1 the smoke density of the products of combustion passing through a stack 2. The complete arrangement of Fig. 1 is disclosed and claimed in the copending application of James F. English, Jr., and Anthony J. Hornfeck S. N. 85,082, filed April 2, 1949.

The measuring system is qualitative rather than quantitative, based upon a continuous determination of the percentage of thermal radiation from a source which reaches a target after passing through a path of fixed dimension in which is flowing a sample stream of the products of combustion bearing radiation absorbing, or obstructing, materials. The instrument does not depend upon "color" and is therefore sensitive to the presence, not only of carbon particles, but also of ash or dust. As explained in the application of English and Hornfeck the scale of the various portions of Fig. 1 is not uniform and not a material limitation. The stack 2 is traversed by a radiation path tube 3 having a slot 4, thus continually presenting a sample stream of uniform cross section to the beam of radiation directed longitudinally through the tube 3 from a source S to a receiver R. It will be appreciated that various factors enter into the relationship between the amount of thermal radiation given off by the source S and that which is received by the target 12 of the receiver R. We need not go into that phase of the problem as we are primarily interested only in the improved device 6 as a receiver which is receptive to, and sensitive to, whatever total bands of wave length of radiant energy are directed to the target.

In general the target 12 of the bolometer is included as one leg of an A.-C. bridge network 13 supplied with alternating current from the secondary winding of a transformer 17 at about 7.5 volts. The output of the network 13 appears as an A.-C. voltage $e_0$ representative of the amount of thermal radiation received by the target 12. The calibration is preferably such that zero smoke indicates maximum reception by the target 12 of thermal radiation from the source S whereas 100% smoke means complete radiation obstruction or absorption between the source and the receiver.

As explained in the copending application, the A.-C. voltage $e_0$ is compared to a voltage $e_x$, and the difference, if any, is effective upon the amplifier and motor control 21 for activating a motor 23 in proper direction and amount to move an indicating-recording pen 24 relative to the chart 1 and a scale 25. At the same time the motor 23 positions a contact 26 along a balancing slide-wire SW for reducing the difference between voltages $e_0$ and $e_x$ to zero to bring the system into electrical balance.

For the purpose of this explanation we choose as a source of thermal radiation S a commercial spotlight of about 150 watts and having a mirrored reflector concentrating the thermal radiation in a path longitudinally through the tube 3 in the direction of the receiver R. Such a light has a total radiant energy distribution as roughly plotted in Fig. 2 of something less than 20% in the visible and more than 80% in the infra-red range of the radiation spectrum. This distribution is not dissimilar from other ordinary tungsten light sources, but the mechanical construction provides a desirable concentration of radiation through the path of the sample.

Figure 2:
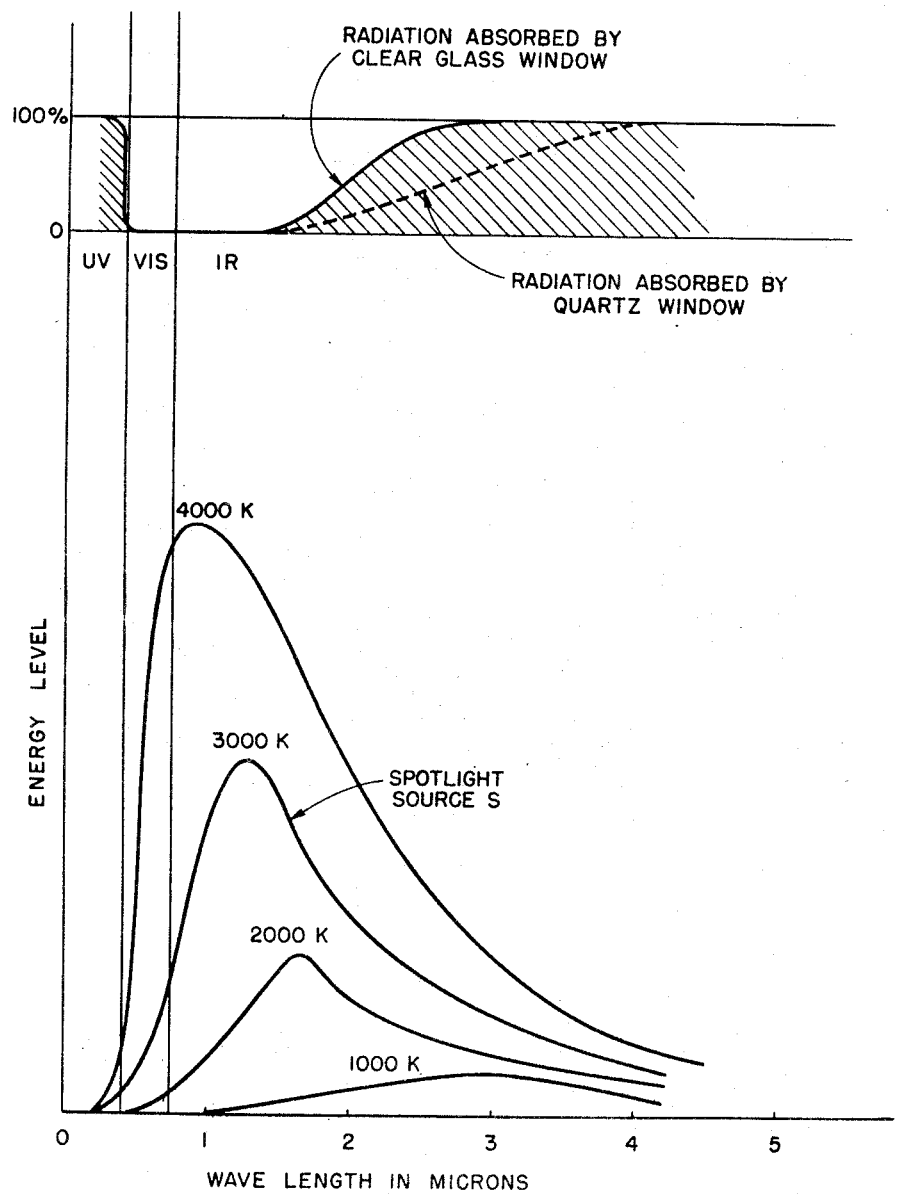
Fig. 2 is a graph of thermal radiation values.

Fig. 2 also shows an approximate comparative plot of the percent of radiation absorbed by a clear glass window and by a quartz window. Inasmuch as the spotlight source has a clear glass window facing the receiver it will be understood that a certain proportion of the thermal radiation emitted by the source is not actually available at the entrance to the sample path 4. This, however, is not particularly important as this, and other possible losses of total quantity of energy, does not change the relative distribution among the wave length bands of the spectrum. Nor does the amount of total radiation which is absorbed by the window of the bolometer R particularly matter, but it will be understood that approximately 70% of the total thermal radiation reaching the window at the bolometer actually passes therethrough to the target 12. The important thing in our present invention is that we have provided a bolometer which is sensitive to all wave lengths of the thermal radiation spectrum which are received by the target and that the target is not limited in its reception to some particular band or bands of wave length as is the case with various types of photo-cells or photo-tubes.

It will be observed from Fig. 2 that the use of a quartz window in front of the target 12 will increase the amount of radiation allowed to reach the target 12 and particularly to extend this reception further into the infra-red end of the spectrum. Thus, should we wish to have our bolometer receptive to a source having a low energy level lying principally in the infra-red range such for example as the lowermost two curves we would use a quartz window in front of the target to minimize the absorption by the window which, as will be pointed out, is necessary as a part of the housing of the target 12.

Referring now in particular to Fig. 3, it will be seen that the bolometer of our invention includes a glass housing consisting of two parts, an internally mirrored paraboloidal reflecting section 40, and a window section 41, sealed together as at 42, and the housing evacuated. A target 12, comprising a tungsten filament, is located at the focal center, in the plane of the latus rectum, of the paraboloidal reflecting surface. The arrangement provides that the target receives several hundred times the radiant energy that it would otherwise receive by direct impingement alone upon the target. In other words the window, looking toward the source S, allows a certain amount of radiation to directly encounter the target 12, but a considerably greater amount of the radiation directly encounters the paraboloidal reflecting surface 40 from which it is reflected and concentrated upon the target 12 to the end that the target receives many times the radiation it receives by direct encounter through the window.

The evacuation of the housing containing the reflecting surface and target minimizes loss of incident radiation (by conduction and convection) after once reaching the target. The window 41 facing the source S is usually of clear glass for closing the evacuated target housing but, as previously mentioned, it may be made of quartz or other material, as dictated by the nature of the source of the radiation to which the target 12 is to be sensitive.

The target 12 comprises a considerable length of tungsten wire wound coil-coil and supported as shown in Figs. 4 and 5 by terminal posts 43, 44 as well as additional wire supports 45.

By way of example, in one preferred embodiment, the filament is wound coil-coil of commercial purity tungsten having a diameter of 1.3 mils and a weight of 3.29 milligrams/200 millimeters. This is the highest resistance with commercial wire now readily available and gives a resistance of 65 ohms at 3.5 volts.

The tungsten wire 46 comprising the target 12 is coil-coil and supported in general as shown in Fig. 4 in oppositely directed, laterally spaced reaches. Each end of the wire is welded or otherwise fastened to an arm 47 which in turn is welded to the terminal post 43 or 44 in the manner shown. Fig. 5 shows a further detail of the supports 45 which are preferably clamped or welded to the wire 46 to prevent vibration or variation in heat conduction. The four posts 45 are shown as rising from a glass bead 48 which in turn is supported by the terminal posts 43, 44.

The effective target area is the wire 46 and, as seen in Fig. 4, this is not concentrated at a small point which might be considered as the focal center of a true parabolic reflector. No attempt has been made to concentrate the target to an extremely small area at a theoretical focal point of a true parabolic mirror. Such an arrangement, while utilizing more of the target area to receive all of the radiant energy reflected from a true parabola would, on the other hand, not receive as large an amount of radiation directly incident thereto through the window and furthermore would be much more critical as to its location at the exact focal point. Additionally the paraboloidal reflecting surface would have to be a very true parabola. Irregularities in the reflecting surface due to manufacturing variables or in the location of the target relative to the exact focal point would be much more critical than the gain which would be accomplished. Furthermore the present arrangement allows a reception upon the target 12 of reflected radiation from a commercially formed paraboloidal surface or from a surface which may purposely be distorted away from a true parabolic shape. In other words, we may purposely distort the curvature of the surface 40 so that the concentration of reflected radiant energy is not at a theoretical point but may be over a certain area encompassed by the complete span of the target 12.

By evacuating the housing we minimize loss, through conduction or convection, of radiant energy from the target 12 after it has been received by the target either directly through the window or reflected upon the target from the surface 40. The general design, as previously mentioned, makes the target receptive to several hundred times the radiant energy that it would otherwise receive only by direct contact through the window. In general the device provides a bolometer which is stable and relatively unaffected by vibration or other mechanical troubles and is limited as to ambient temperature only by the melting point of the glass envelope or of soldered or brazed electrical connections. The target 12 is receptive of, and sensitive to, all wave lengths of radiant energy which reach it, and thus the bolometer is limited only as to the screening out by the window 41 of radiant energy which may be directed toward the target. As previously mentioned, the window may be made of material other than clear glass to reduce this screening effect.

What we claim as new and desire to secure by Letters Patent of the United States, is:

1. In a bolometer of the electric resistance type, in combination, a highly evacuated sealed housing comprising a reflector portion of paraboloidal shape mirrored on the inner surface and a window portion joining the reflector portion in a plane beyond and substantially parallel to the latus rectum of the reflector; a target in said housing of extended area lying substantially in the plane of said latus rectum, spanning the focal center of the reflector and formed as a receptive grid of a relatively great length of coil-coil resistance wire having a diameter of the order of one mil and composed of a plurality of oppositely directed, laterally spaced reaches; a pair of conducting posts passing through the wall of the reflector portion; means connecting the ends of said resistance wire to said posts; and insulated means supporting said reaches in the plane of said grid.

2. The bolometer of claim 1 wherein the resistance wire is tungsten of commercial purity having a resistance of approximately 65 ohms at 3.5 volts.

3. The bolometer of claim 1 wherein the window is formed of material less absorbent than glass of ultra-violet and infra-red rays.

VICTOR S. RUTHERFORD.
JAMES F. ENGLISH, Jr.

REFERENCES CITED

The following references are of record in the file of this patent:

UNITED STATES PATENTS

| Number | Name | Date |
| --- | --- | --- |
| 1,639,412 | Mechau | Aug. 16, 1927 |
| 2,252,476 | Wright | Aug. 12, 1941 |